United States Patent [19]

White

[11] Patent Number: 5,273,138
[45] Date of Patent: Dec. 28, 1993

[54] REDUCED DIAMETER TRUCK BRAKE SYSTEM

[75] Inventor: Jay D. White, Galesburg, Mich.

[73] Assignee: Eaton Corporation, Cleveland, Ohio

[21] Appl. No.: 55,940

[22] Filed: May 3, 1993

Related U.S. Application Data

[63] Continuation of Ser. No. 799,816, Nov. 29, 1991, abandoned.

[51] Int. Cl.$^5$ .............................................. F16D 51/22
[52] U.S. Cl. ................................. 188/329; 188/264 R
[58] Field of Search .............. 188/218 R, 264 R, 325, 188/327-332, 2506, 258, 264 AA

[56] References Cited

U.S. PATENT DOCUMENTS

| 2,116,174 | 5/1938 | Kay | 188/325 |
|---|---|---|---|
| 2,978,073 | 4/1961 | Soddy | 188/218 R |
| 3,069,209 | 12/1962 | Bauer | 188/218 R X |
| 3,196,987 | 7/1965 | Mode et al. | 188/330 X |
| 3,583,533 | 6/1969 | Jones et al. | 188/264 R X |
| 4,476,968 | 10/1984 | Urban et al. | 188/329 |
| 4,620,616 | 11/1986 | Martin | 188/264 AA X |
| 5,062,506 | 11/1991 | White | 188/329 |

FOREIGN PATENT DOCUMENTS

| 1096126 | 12/1960 | Fed. Rep. of Germany ... 188/218 R |
|---|---|---|
| 787085 | 9/1935 | France ............................ 188/327 |
| 782092 | 1/1936 | France ......................... 188/218 R |
| 1342398 | 9/1963 | France ............................ 188/325 |
| 590943 | 8/1947 | United Kingdom ............... 188/325 |

OTHER PUBLICATIONS

Rockwell International, *Automotive Operations Product Catalog #SP-8067*, Aug., 1981.

*Primary Examiner*—Robert J. Oberleitner
*Assistant Examiner*—Alfred Muratori
*Attorney, Agent, or Firm*—L. H. Uthoff

[57] ABSTRACT

A truck brake having a brake assembly mounted to an axle housing and a brake drum placed over the brake assembly attached to a wheel where the brake assembly has a pivoted cam acting against a cam roller mounted to a brake shoe where the cam pivot is located approximately midway between the outer diameter of an axle and the inner surface of the brake drum and the brake shoe has a slot in the brake table to allow removal of an actuation return spring and the drum has a plurality of generally axially extending airflow channels in an outer surface and a squealer band located at an edge of the brake drum opposite a partially closed face.

4 Claims, 4 Drawing Sheets

FIG 2B
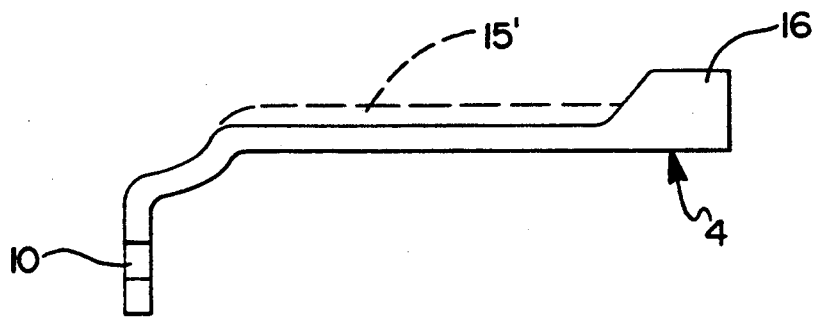
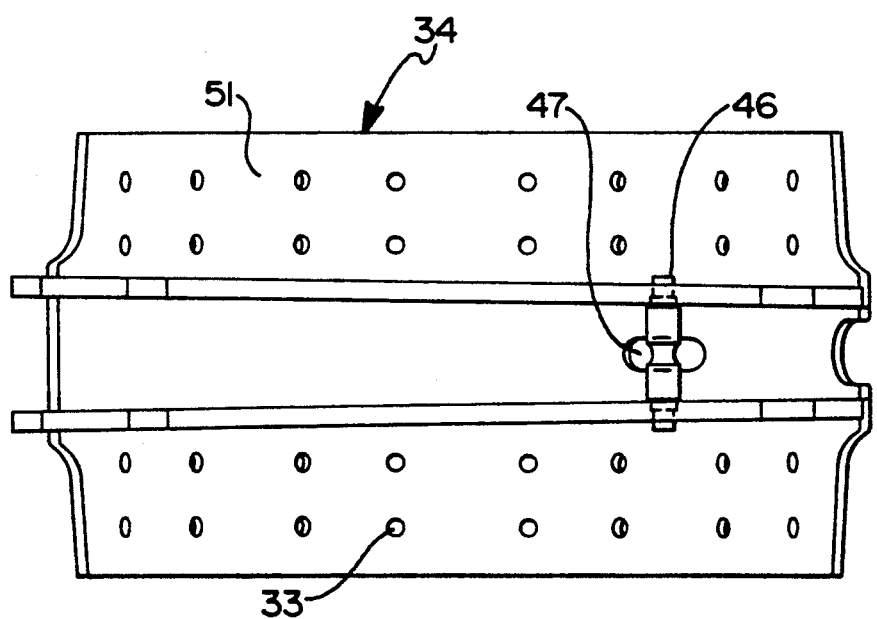
FIG 5

REDUCED DIAMETER TRUCK BRAKE SYSTEM

This is a continuation of copending application Ser. No. 07/799,816 filed on Nov. 29, 1991 now abandoned.

RELATED APPLICATIONS

This application is related to application Ser. No. 07/799,819 entitled Truck Brake Drum With Increased Cooling assigned to the same assignee, Eaton Corporation, as the Application and filed the same date Nov. 29, 1991 as this Application.

FIELD OF THE INVENTION

This invention relates to a truck brake assembly having a reduced outside diameter. More specifically, this invention relates to a truck brake system having a reduced outside diameter with a brake shoe actuation mechanism having extended travel capabilities so that a relatively radially thick brake lining can be utilized where the tire bead operating temperature is reduced by increasing airflow over the outer surface of the brake drum with the use of airflow channels contained therein and the brake squealer band is positioned at the innermost edge of the brake drum, all for extended service life.

DESCRIPTION OF THE PRIOR ART

Prior art truck brake systems have been designed to function with a large diameter wheel and tire. The term "truck" as used herein also includes a tractor or trailer or semi-trailer. One method to increase the cargo carrying capability of a truck trailer is to lower the floor of the trailer bed since the height and width of the trailer are government regulated to maximum dimensions. Lowering the floor of the trailer would increase the cargo space but would interfere with the trailer tire if the current suspension system is retained. If smaller tires were fitted to the trailer, the trailer bed could be lowered without interference. However, reduced diameter tires would also require a smaller diameter wheel due to the construction and load requirements of the tire. A smaller diameter wheel, in turn, can only accommodate a smaller diameter brake assembly and the braking capacity of prior art brake systems having a reduced diameter would not meet industry requirements. The reduced diameter brake assembly would operate at a much higher temperature for a given truck gross vehicle weight (GVW) at a specified stopping distance and/or stopping duty cycle. The tire bead would see increased temperature due to the heat generated by the brake being transferred into the wheel rim thereby reducing tire life and increasing the risk of catastrophic failure.

One prior art method to dissipate heat from the brake drum is to add axial fins to the outside of the drum extending from the wheel/drum interface to the squealer band. However, this increases surface area of the drum and results in added heat transfer into the wheel rim and tire.

A method to increase the braking capability of a reduced diameter brake and thereby reduce brake operating temperatures for a given brake duty cycle, would be to increase the width of the brake drum and the associated brake assembly. This solution is expensive and presents packaging problems.

Another solution would be to maximize the diameter of the brake drum within the confines of the wheel and increase the width slightly. This creates a problem with airflow over the surface of the brake drum in that the close proximity of the wheel restricts airflow and the increased distance over which it must travel would result in higher brake temperatures.

Another problem is that a reduced diameter brake will exhibit a greater rate of brake lining wear due to its higher unit area loading at the lining drum interface. To obtain adequate life out of the brake lining material, it is necessary to increase the thickness thereof which would result in an increased demand on the actuating mechanism where the shoes must be adjusted to a greater degree over the life of the brake. The brake shoe actuation mechanism would have to yield greater travel since the lining material wear would require additional adjustment for clearance between the lining and brake drum.

SUMMARY OF THE INVENTION

The truck brake assembly of the present invention allows a smaller diameter wheel and tire to be used on a truck trailer while meeting operational and service life requirements, thereby permitting the trailer floor to be lowered to increase cargo space. The brake outside diameter is maximized yet will still fit inside the smaller diameter wheel and the increase in width is minimized. The amount of cooling airflow is increased over the outer surface of the drum between the drum and the wheel with the use of airflow channels formed in the outside surface of the drum and extending from the wheel side of the drum to approximately the midpoint of the drum. To further enhance airflow over the outside surface of the drum by increasing the clearance between the drum and the wheel rim, the brake drum squealer band is relocated from a position somewhat inboard of the open end of the brake drum to a position as close to the innermost edge of the open end of the brake drum as possible.

To extend the life of the brake lining material, its thickness is increased and the position of the actuation mechanism known as an "S-cam" is optimized to provide for maximum radial travel of the brake shoes inside the brake drum so that the additional change in the thickness of the lining over its life can be accommodated. Special spring slots are formed into the brake shoe table so that the brake actuation return springs can be positioned to clear the S-cam and still package between the axle outer diameter and the S-cam. The S-cam itself may be grooved at one end to provide clearance with the return spring or the cam and return spring can be axially offset.

By using the brake of the present invention, the wheel and tire diameter can be reduced from its current 22½" diameter down to 19½" with adequate brake capacity, brake lining and tire life.

One provision of the present invention is to provide an S-cam mechanism with maximized travel to allow a thicker brake lining material to be utilized to extend service life.

Another provision of the present invention is to provide a modified brake shoe to permit removal of an actuation return spring which clears the S-cam.

Another provision of the present invention is to provide airflow channels on the outside surface of the brake drum to increase cooling airflow and thereby minimize temperature of the tire bead for extended life.

Another provision of the present invention is to relocate the brake drum squealer band to provide additional clearance between the brake drum and the wheel for increased airflow therebetween to minimize the temperature of the tire bead.

Still another provision of the present invention is to provide a brake drum assembly that can be fitted to a smaller diameter wheel where the outside diameter of the brake drum is maximized and the drum width is minimized while maximizing airflow cooling.

BRIEF DESCRIPTION OF THE DRAWINGS

FIG. 2B is a cross-sectional view of the drum showing an alternative embodiment of an airflow channel;

FIG. 5 is a sectional view of FIG. 4 taken along line V—V showing the spring clearance slot of the present invention.

DESCRIPTION OF THE PREFERRED EMBODIMENT

Figure 1:
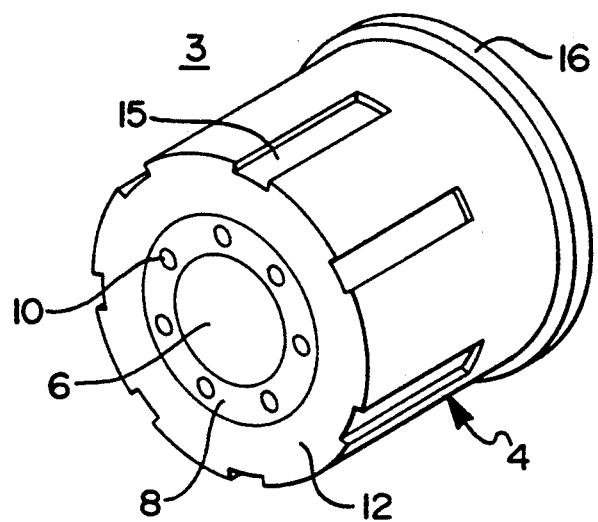
FIG. 1 is a perspective view of a truck brake drum with airflow channels and relocated squealer band of the present invention.

Referring to FIG. 1, a brake drum 4 is shown which is cylindrical in shape with a partially closed end 12 for mounting to a truck axle shaft using a plurality of bolts passing through bolt holes 10 in a mounting flange 8 where a center section 6 is removed and operates as a pilot over the axle shaft. The drum partially closed end 12 is sandwiched between the axle shaft and a truck wheel. A plurality of airflow channels 15 are formed in the outer peripheral surface of the brake drum 4 and function to improve airflow over the surface of the drum 4, thereby providing a cooling effect which lowers the temperature of the wheel rim 18 and subsequently the tire bead 26 of a tire 22 mounted thereon for increased service life.

Figure 2A:
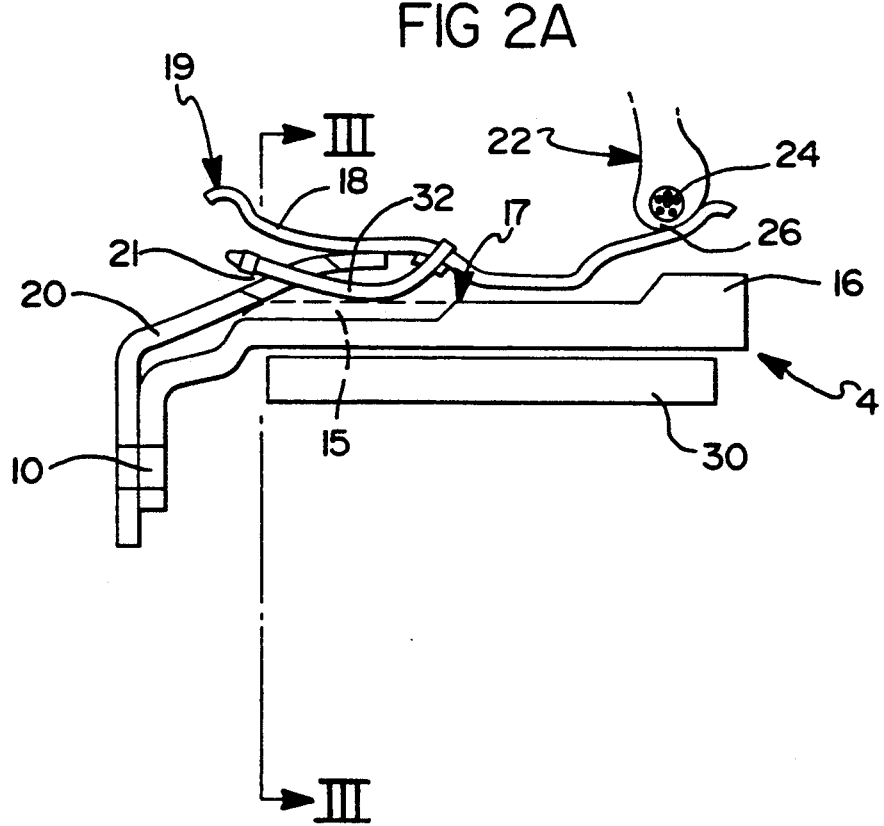
FIG. 2A is a cross-sectional view of the drum in FIG. 1 having a wheel mounted thereon.

Now referring to FIG. 2A, a cross-section of a brake drum 4 with the improved cooling airflow channels and a relocated squealer band is shown. Airflow channels 15 have been formed in the outer surface of the brake drum 4 and extend to approximately the midpoint of the brake drum outer surface 17 thereby providing for increased clearance between the brake drum 4 and the wheel rim 18. FIG. 2B shows an alternative embodiment of the airflow channel 15' where the channel extends from one end of the brake drum 4A to the squealer band 16 for additional cooling airflow.

Also shown in both FIG. 2A and 2B is the relocated squealer band 16 where its position has been moved to the innermost edge of the brake drum 4 thereby providing clearance between the squealer band 16 and the wheel rim 18 at the position of the tire bead 26. A brake squealer band 16 is shown which is comprised of an increased thickness of metal in the form of a circumferential ring on the outer surface of the brake drum 4 which serves to alter the vibration characteristics of the brake drum 4 to minimize high frequency squeal. The relocation of the squealer band 16 to this position, promotes airflow over the surface of the brake drum 4 and increases the distance between the squealer band 16 and the wheel rim 18 resulting in a lower temperature of the tire bead area 26 for extended life and improved durability. Also shown is the brake shoe 30 which is movable radially outward to contact the inner surface of the brake drum 4 causing a retarding torque to be developed which is transferred into the wheel 19 through the wheel mounting bolts 23 thereby slowing the vehicle. The wheel 20, which is attached to the wheel rim 18, extends towards the center of the brake drum 4 so as to engage the plurality of wheel mounting bolts 23 extending from an axle spindle. By using the present invention to increase airflow over the surface of the brake drum, the tire bead area 26 temperature is typically lowered by 20° F. which results in a significant increase in tire life. Outside air is drawn through the wheel hand hold openings 21 along the airflow channels 15 under the wheel rim 18 and exits between the wheel rim 18 and the squealer band 16. To improve the airflow, the airflow channels 15 are in approximate alignment with the wheel hand hold openings 21.

Figure 3:
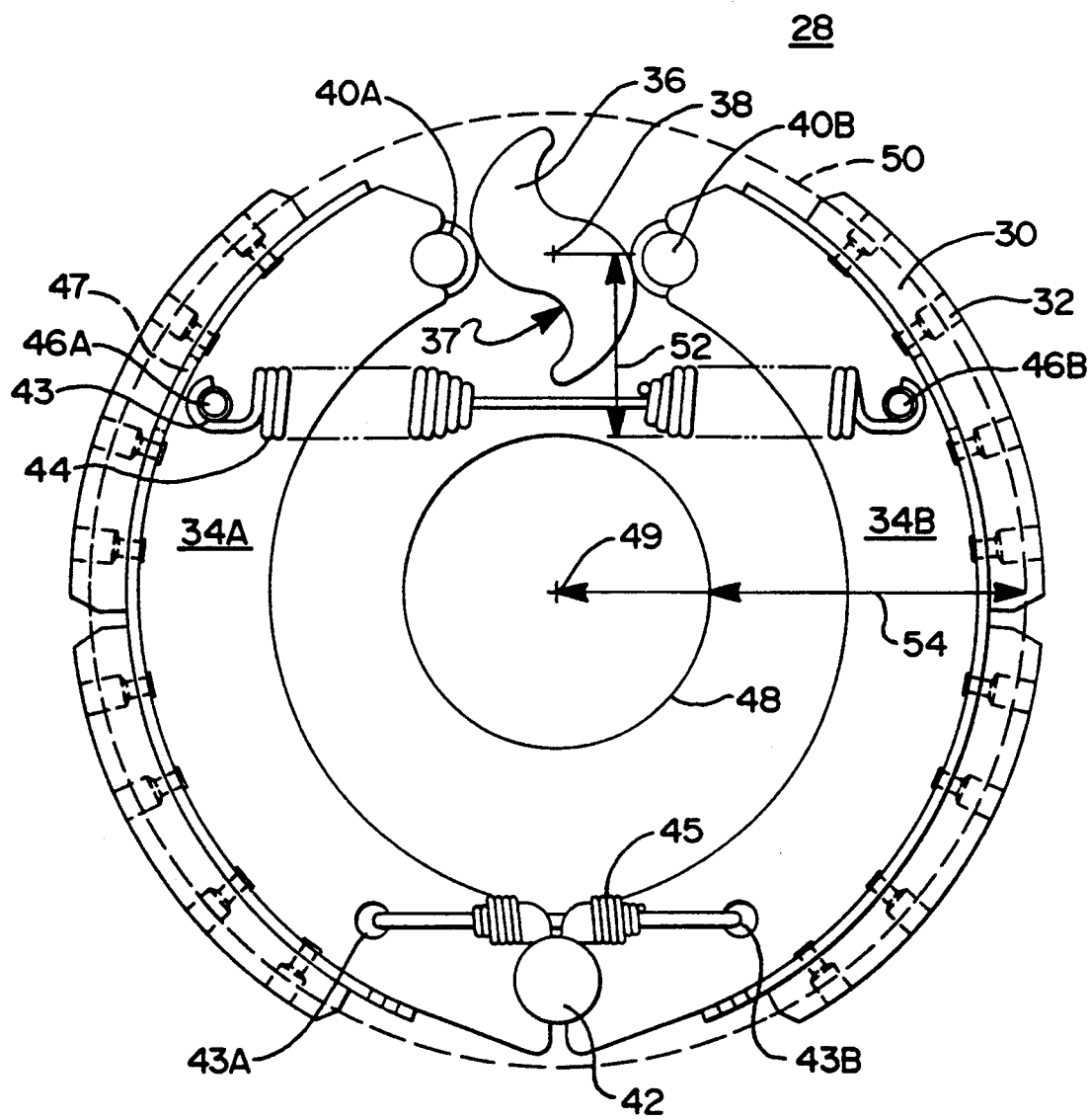
FIG. 3 is a sectional view of the brake assembly of the present invention taken along line III—III.

Now referring to FIG. 3, an end view of the brake along line III—III of the present invention is shown. For purposes of illustration and simplification, the brake drum 4 is not shown, thereby uncovering the brake assembly 28 which is mounted to a truck axle housing. With the use of the present invention, the brake lining 30 which rubs against the inner surface of the brake drum 50 to produce a braking torque can be maximized in thickness so as to increase the operating life of the brake so that a smaller diameter brake and brake drum can function under the same duty cycle and vehicle GVW and result in the same service life as a traditional larger diameter wheel, brake drum and brake assembly. A thicker brake lining 30 is shown mounted to brake shoes 34A and 34B which are mounted using brake pad rivets 32. The brake shoes 34A and 34B pivot at one end at brake shoe pivot 42 and are moved by rotation of the S-cam 36 so as to separate or come together at the end opposite the pivot 42 so as to increase or decrease the overall diameter so that when a braking action is required the end of the brake shoes 34A and 34B is separated so that the brake lining 30 contacts the brake drum inner surface 50. When no braking is required, the brake shoes 34A and 34B contract together so as to maintain a clearance between the brake lining 30 and the brake drum inner surface 50 to eliminate any friction.

The operation of an S-cam 36 in a brake assembly may be seen by reference to U.S. Pat. No. 4,476,968 the disclosure of which, is hereby incorporated by reference.

The expanding or contracting of the brake shoes 34A and 34B is accomplished by the rotation of S-cam 36 about a cam axial pivot 38 which operates against a pair of cam rollers 40a and 40b which impart the displacement caused by the rotation of the S-cam 36 into the brake shoes 34A and 34B causing the brake shoes 34A and 34B to expand to a larger diameter or contract to a smaller diameter as desired. Brake shoes 34A and 34B pivot at an end opposite that of the cam rollers 40a and 40b on a brake shoe anchor pin 42.

To maximize the range of movement of the brake shoes 34A and 34B, the S-cam 36 is located so that the cam axial pivot 38 is mounted to the brake assembly 28 at a point that lies approximately one-half the distance from the outer diameter of the axle shaft 48 having a centerline 49 to the brake drum inner surface 50. This distance is represented by line 52 which is approximately one-half of the distance represented by line 54. Typical values for a truck brake are a brake drum 4 inner diameter of 15 inches and a width of 8.625 inches with a S-cam axial pivot located at a distance of 5.25 inches from the axial centerline of the axle and 2.25 inches from the axle outside diameter 48.

The cam pivot is located as close as possible to the ideal pivot point as defined above, but is limited by interference with an actuation return spring 44. In this manner, the S-cam 36 can provide the greatest actuation distance to separate the brake shoes 34A and 34B as it is rotated since its overall length can be also maximized without interference with the other brake components.

To further maximize the range of movement of the brake shoes 34A and 34B, the S-cam 36 is designed so that the throat 37 is set back and narrowed to increase the lift of the S-cam 36 to a value of 1/10 to ⅛ of the brake drum 4 diameter. The lift is defined as the difference between the distance separating the brake shoes 34A and 34B at a maximum and a minimum as the S-cam 36 is rotated through its range of motion.

The S-cam 36 clearance from the actuation return spring 44 can be increased by forming a slot in the end of the S-cam 36. This permits the cam axial pivot 38 to be located closer to the ideal position of midway between the outside diameter of the axle 48 and the brake drum inner surface 50.

The brake shoes 34A and 34B are held so that there is constant contact between the cam 36, cam rollers 40a and 40b and the brake shoes 34A and 34B by an actuation return spring 44 and a retaining spring 45. Upon assembly, the actuation return spring 44 is stretched and secured in place by the fitting of two curved ends forming a spring retention hook 43 on the ends of the actuation return spring 44 that fit over a pair of spring retention pins 46a and 46b located on the brake shoes 34A and 34B respectively. The physical separation of the spring retention pins 46a and 46b generates a tension in the actuation return spring 44 tending to hold the brake shoes 34A and 34B together and pull the shoes 34A and 34B away from the brake drum inner surface 50 when a braking action is not required.

In a similar fashion, the retaining spring 45 is secured in place by hooks formed on the pair of ends on retaining spring 45 which engage spring retention holes 43a and 43b in brake shoes 34A and 34B respectively producing a tension in the retaining spring 45 which tends to pull the brake shoes 34A and 34B together so as to maintain contact with the brake shoe anchor pin 42.

Figure 4:
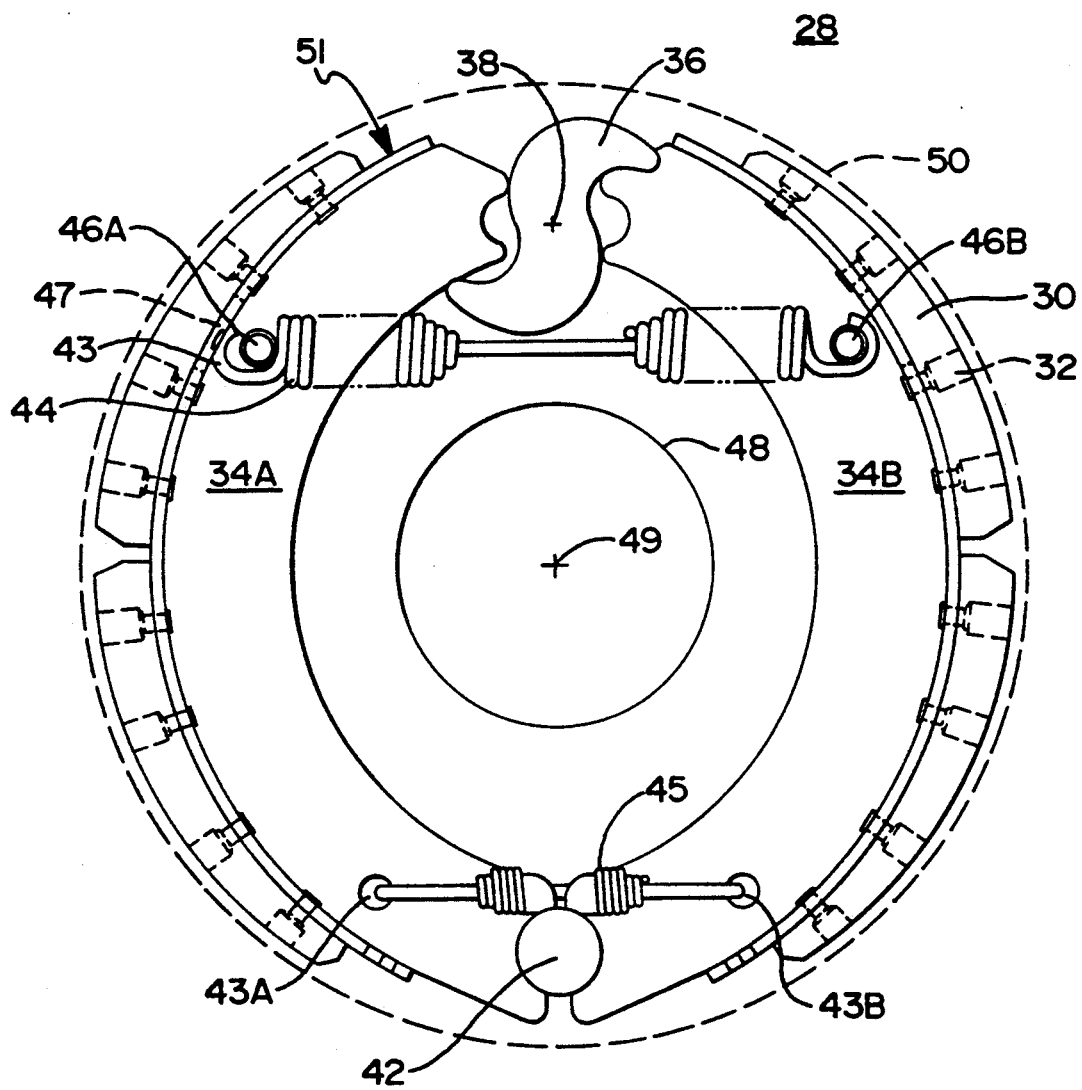
FIG. 4 is a sectional view of the brake assembly of the present invention taken along line III—III with the cam rollers removed.

Referring to FIG. 4, the brake assembly 28 of the present invention is shown with the cam rollers 40a and 40b removed as a first step in the disassembly of the serviceable brake components. If the actuation return spring 44 is to be removed, it must be moved laterally to the extent necessary for the spring retention hook 43 that engages the spring retention pin 46 to have clearance so that the actuation return spring 44 can be displaced for removal. Since the cam pivot 38 has been moved as close as possible to the point midway between outside diameter of the axle 48 and the brake drum inner surface 50, the spring has also been located at a point closer to the axle outside diameter 48. The springs must be of sufficient tension to hold the brake shoes in place under a force of approximately 8 g's which generally requires additional spring coils for a brake with increased radial movement. If a spring meeting this requirement is installed on the reduced diameter truck brake assembly 28 of the present invention, the spring retention hook 43 of the spring would interfere with the brake shoe table 51 when moved laterally for removal and the spring retention hook 43 would not clear the spring retention pin 46a. To allow for removal for the actuation return spring 44, a spring clearance slot 47 has been cut into the brake shoe table 51.

Referring now to FIG. 5, the spring clearance slot 47 formed in the brake shoe table 51 is clearly shown where it is positioned directly in line with the spring retention pin 46.

It will be appreciated by those of ordinary skill in the art that many variations in the foregoing preferred embodiment are possible while remaining in the scope of the present invention. The present invention should thus not be considered limited in the preferred embodiments or the specific choices of materials, configurations, dimensions, applications or ranges of parameters employed therein.

What is claimed is:

1. An improved brake for a motor vehicle of the type in which a brake shoe frictionally contacts an inner surface of a rotating brake drum where said brake shoe is mounted on a brake table supported by two substantially parallel opposed webs mounted generally perpendicular to said brake table where a return spring support pin traverses said webs and where said support pin supports a brake return spring having one end formed into a hook the improvement comprising:

a slot formed in said brake table adjacent to said support pin defined by an aperture formed in said brake table and said brake shoe and oriented to provide clearance for said return spring hook when said return spring is installed and removed from said support pin.

2. The improved brake for a motor vehicle of claim 1, wherein said brake drum has an outer surface having a plurality of generally axially extending airflow channels formed therein for providing increased airflow over said outer surface.

3. The improved brake for a motor vehicle of claim 2, wherein said brake shoe is moved to contact said inner surface of said brake drum by contacting a cam rotating about a cam axial pivot and where said brake shoe is moved away from said inner surface by a force imparted by said return spring.

4. An improved cam actuated expanding shoe drum brake comprising:

a selectively displaceable brake actuation means, said actuation means comprising a rotatable cam;

a pair of generally arcuate radially outwardly moveable brake shoes, each of said brake shoes carrying a cam follower member at one end thereof engaged by said actuation cam for movement therewith, said actuation cam having a first position for allowing said shoes to be radially retracted and a second position for causing said shoes to be radially expanded;

each of said brake shoes comprising a web structure, said web structure defining a first and a second generally parallel opposed surfaces, and a table structure generally perpendicular to said web structure and carrying friction material on a radially outer surface thereof;

a spring retention pin generally perpendicular to and extending between said opposed surfaces of said web structure;

a shoe return spring having a hooked end portion attached to said brake shoe around said spring retention pin for forcing one of said brake shoes toward the other brake shoe wherein the improvement comprises:

a slot formed as an aperture in said table structure located adjacent to said spring retention pin in said table structure for allowing said hooked end portion to clear said table structure when said shoe return spring is attached to said spring retention pin.

* * * * *